United States Patent Office 3,840,686
Patented Oct. 8, 1974

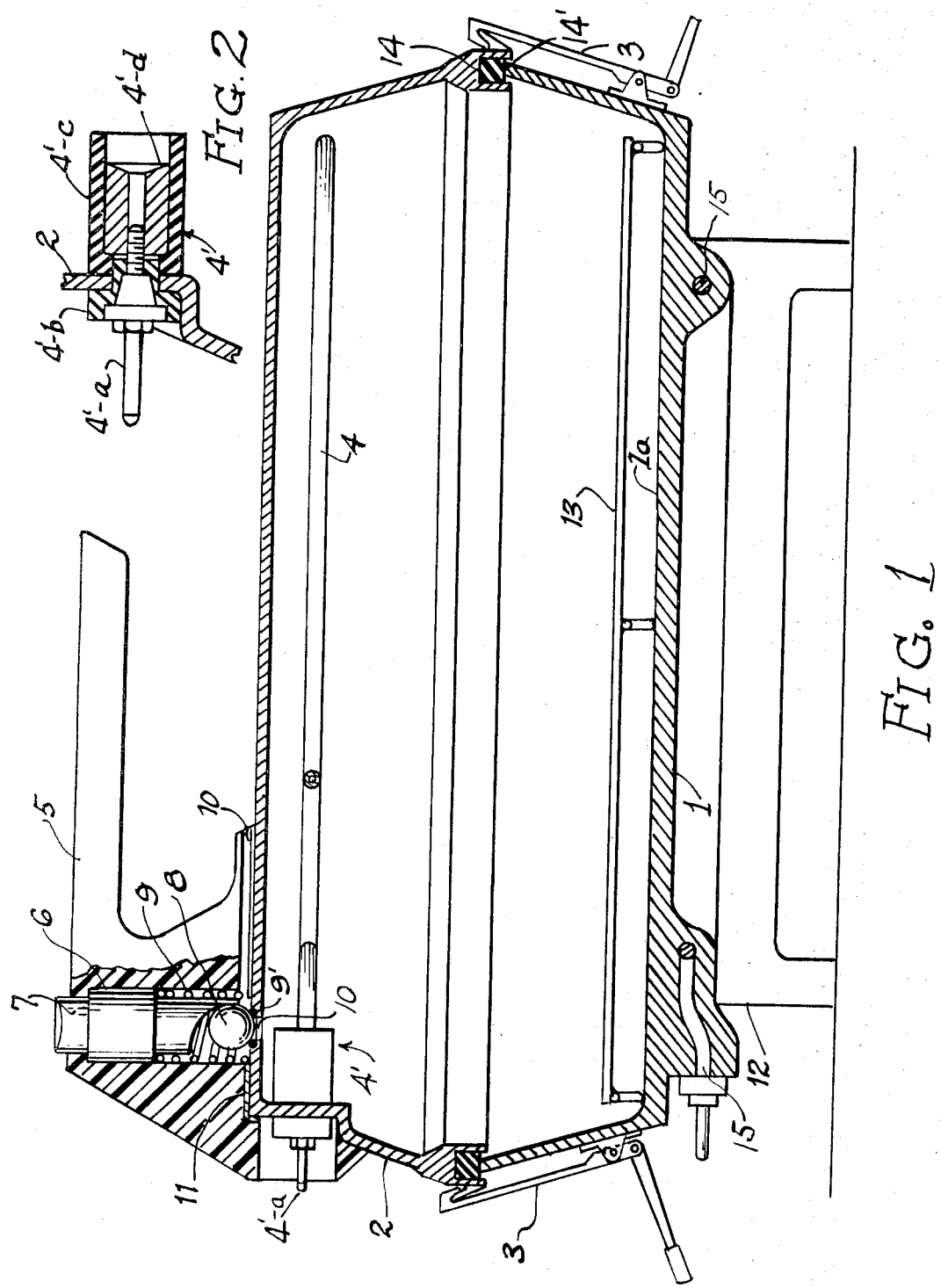

3,840,686
METHOD OF COOKING AND THAWING
Mathew Hurwitz, 63 Oakland Ave.,
Auburndale, Mass. 02166
Original application July 21, 1971, Ser. No. 164,612, now Patent No. 3,769,902. Divided and this application July 18, 1973, Ser. No. 380,428
Int. Cl. A23l 1/00
U.S. Cl. 426—231     5 Claims

ABSTRACT OF THE DISCLOSURE

A vessel and process for cooking and/or thawing of foods utilizing heat transfer via direct-contact condensation of substantially air-free steam at sub-atmospheric (partial vacuum) pressures onto the food. A purge-venting means and method automatically flushes air from the vessel to initiate the partial vacuum and manual or automatically actuated valve means relieves the vacuum to terminate the process. Cooking and/or thawing takes place at controlled temperatures below the normal boiling point of water.

---

This a division of application Ser. No. 164,612, filed July 21, 1971, now U.S. Pat. No. 3,769,902.

BACKGROUND OF THE INVENTION

This invention relates to a thawer-cooker vessel and a method of using the same. In cooking, re-warming, or forced thawing, cooking heat is generally transferred to food from a source such as a flame or electric heating element by such mechanisms as conduction, as in the case of foods in direct contact with a heated utensil, or by convection, as in the case of foods immersed in water, cooking oils or in air. In utilizing a pressure cooker, heat is transferred to food by direct contact condensation of essentially pure steam. The heat transfer coefficient for the condensation of pure steam is 100 to 1000 times greater than that associated with the natural convection of air, as in an oven, and is generally 10 to 100 times higher than that achievable through conduction or convection when food is in contact with heated liquids, even, boiling liquids.

The pressure cooker suffers several well-known real and imagined disadvantages which have kept it from being widely accepted by the housewife. Among these are the potential explosion hazard, the constant hissing noise caused by steam escaping from the pressure relief valve, the comparatively high cooking temperatures which are generally fixed at about 250° F. which cause overcooking of some delicate foods, the steaming-up and smelling-up of the kitchen during cooking due to the constant evolution of aroma-bearing steam, the concomitant loss of flavors, aromas, and, to some extent, nutrients, and the unwanted blending of flavors such that, for example, vegetables generally lose their individuality. The common pressure cooker is an inflexible utensil since it operates efficiently in the condensation mode of heat transfer only at one fixed temperature controlled by the pressure relief valve. For example, with a pressure relief valve set at 15 p.s.i.g. all cooking must take place at the boiling point of water for that pressure which, in this case, is about 250° F.

My thawer-cooker and method of using the same provides high heat transfer coefficients associated with condensation of pure steam but eliminates or greatly reduces the above-mentioned disadvantages of the common domestic pressure cooker. My invention offers such advantages as rapid cooking rates that are competitive with the pressure cooker; flexible temperature control from 212° F. down to about 100° F.; fast, safe, airless thawing of frozen foods with minimal surface cooking; the ability to hold foods for long times at serving temperatures safely because of the sealed operation and almost complete absence of air which contribute to retaining food moisture and maintaining flavor; and, silent, ventless operation which greatly reduces waste, heat, and cooking odors in the kitchen.

SUMMARY OF THE INVENTION

Therefore, it is an object of the present invention to provide a thawer-cooker and method for thawing-cooking a solid foodstuff utilizing the thawer-cooker of my invention. It is another object of this invention to provide fast, silent, ventless cooking.

Therefore, the present invention provides a thawer-cooker vessel comprising, in combination, a container having a bottom, a side wall, sealing means disposed at the upper edge of said side wall, a lid extending over the entire container, said lid having sealing means to co-operatively engage said side wall sealing means to form a closed air-tight chamber, latching means for securing said lid to said container, heating means and control means to regulate the temperature of said chamber, and a purge-venting means which automatically opens to the atmosphere at a predetermined vessel pressure slightly above atmospheric pressure, and automatically closes to the atmosphere when the vessel pressure falls below said predetermined pressure, said purge-venting means also providing release means to admit air permitting removal of said lid when the thawing or cooking process is complete.

My invention also provides in combination with my thawing-cooking vessel, a method for thawing and/or cooking solid and liquid foodstuffs which comprises: (a) introducing a predetermined amount of water into said vessel and placing said foodstuff onto food supporting means in said vessel; (b) closing and latching said vessel with said lid and latching means whereby air is entrapped within said vessel; (c) heating said water in said vessel with said heating means so that steam is generated which increases the pressure within the vessel whereby said purge-venting means automatically opens for a controlled time sufficient to flush from said vessel substantially all of said entrapped air leaving substantially air-free steam in said vessel; (d) conditioning said heating control means to reduce heat input causing the vessel to revert to a controlled cooking temperature below about 212° F. whereby steam pressure decreases and whereby said purge-venting means automatically closes and seals said vessel against the re-entry of air into said vessel; (e) completing the cooking operation at sub-atmospheric pressure (partial vacuum) conditions wherein heat is transferred to the foodstuff via direct-contact condensation of said substantially air-free steam onto said foodstuff; (f) relieving said partial vacuum inside said vessel through said purge-venting means so that said lid may be unlatched and removed; and, (g) removing said cooked foodstuff from said vessel.

The invention can be most clearly described and illustrated with reference to the attached drawing which is a schematic representation of specific embodiment of my invention.

BRIEF DESCRIPTION OF THE DRAWINGS

FIG. 1 is a vertical cross-section view of an embodiment of my invention; and

FIG. 2 is a vertical cross-sectional view of a structural detail, on an enlarged scale.

BRIEF DESCRIPTION OF A PREFERRED EMBODIMENT

Referring now to FIG. 1, my thawer-cooker vessel comprises, in combination, a container 1 having a bottom 1a, a side wall 1b and sealing lip 14' disposed at the upper edge of the side wall. Lid 2 extends over the entire container 1 and is supported thereby. Lid 2 has sealing means 14 to secures the lid to the container of seating the seal 14. co-operatively engage the side wall sealing lip 14' to form a closed air-tight chamber, as shown. Latching means 3 secure the lid to the container for seating the seal 14. Heating means 15 and heating control means (not shown) regulate the temperature of the chamber within the container. The container may be supported on a suitable base or legs 12 secured to the container bottom.

In a preferred embodiment, handle 5 contains purge-venting means 6-10 that automatically seals the vessel to the atmosphere at a predetermined pressure just above atmospheric and automatically opens to the atmosphere when the vessel pressure exceeds this predetermined pressure. Said purge-venting means also provides vacuum relief means for manually equalizing vessel pressure with the atmosphere to permit ultimate removal of the lid 2.

It will be seen from FIG. 1 that the purge-venting means and vacuum relief means may be comprised as follows. The purge-venting means may consist of a check ball 8 seated on an elastomeric O-ring 8', which cooperate to seal an orifice 10 in the lid 2. When the vessel pressure exceeds that required to raise the ball 8 off its seat 8', gases will exhaust from the vessel through the orifice 10 escaping through the channel 10' provided in the handle 5. The vacuum relief means 6 may comprise a button 7 which may be manually depressed to unseat ball 8 from seat 8'. A return spring 9 holds the button 6 away from the ball at all other times.

Further with reference to FIG. 1 the lid 2 may contain an electric broiler heating element 4 which is detachably connected to two air-tight electrical feed throughs indicated generally by the numeral 4', which are themselves fixedly installed to the wall of the lid. A feed through 4' is shown diagrammatically in more detail in FIG. 2.

FIG. 2 shows a typical feed through embodiment which consists of four parts: a stud 4'a which, in a single piece, comprises an electrical connector pin to engage the broiler controller, a hexagon or other appropriate surface for engaging with a wrench or suitable tool during assembly, a tapered portion, and a threaded portion; an outer electrical insulator 4'b which fits through a hole in the vessel lid 2 and which has a tapered hole to receive the tapered portion of stud 4'a; an inner electrical insulator 4'c, and; a boss 4'd which is threaded to engage with the threaded portion of 4'a and which has a hole to receive one of the electrical plugpins of the broiler element 4. By this means the broiler element may be unplugged and removed without tools from the lid without breaking the air-tight integrity of the vessel lid and the feed throughs.

It is understood that the handle 5 may be attached to lid 2 by any suitable means, not shown, which does not affect the air-tight integrity of the lid. If desired, an insulating gasket 11 may be disposed between the handle and the lid. Although FIG. 1 shows the use of a built-in electrical heating element 15, it will be understood that my invention contemplates the elimination of the heating element 15 and base support 11 and positioning of the vessel directly over the burner of an ordinary gas or electric range. The vessel also may be combined with a kitchen range or kitchen counter top. For example, my thawer-cooker vessel may be incorporated into a free-standing range. The cooking chamber may be a rectangular cavity built into the range and, since it is a lightweight assembly, it may be made to slide in and out of the range like a drawer. It is understood that suitable electrical heating and/or broiling elements, vacuum-tight feed-throughs, latching means, and purge-vent means may be suitably disposed so that the entire thawer-cooker vessel, when in a closed position, is not apparent to the eye and would be esthetically pleasing.

The purge-venting means may comprise any suitable form of check valve. The lid itself may serve as the purge-vent check valve in which case a separate vacuum relief valve would be provided to facilitate removal of the lid at the completon of a cooking process.

In combination with the thawing cooking vessel, as described with reference to FIG. 1, a method for thawing and/or cooking a foodstuff utilizing my vessel has been developed. A small volume of water, typically 2–4 ounces, is introduced into the vessel and the food to be thawed and/or cooked is placed onto food supporting means 13 which supports the food above the bottom of the vessel. The vessel is closed and latched and air is thereby entrapped within the vessel. The water in the vessel is then brought to boil by the heating means, automatically controlled if desired, so that steam is generated which increases the pressure within the vessel to a level sufficient to open the purge-venting means.

In the preferred embodiment of FIG. 1, when the pressure thus generated reaches a level sufficient to unseat the check ball 8 off its O-ring seat 8', steam and with it, air, escapes from the orifice 10 and is vented outwardly via channel 10'. The check ball weight and seat area govern the pressure at which the purge-vent valve opens.

Usually a pressure of no greater than about $\frac{1}{10}$ p.s.i.g. is required to raise the check ball off of the O-ring. The purge-venting means remains open for a time sufficient for the escaping steam to sweep from the vessel substantially all of the entrapped air, leaving substantially air-free steam in the vessel. Depending on the volume and, thermal mass of the vessel, the size and temperature of the load, and the capacity of the heating element, the air purge process is generally completed within a period of from about 2 to 3½ minutes. When this purge cycle is completed, at an instant which may be governed manually, or automatically either by thermostat or by an electric or mechanical timer within the controller, the heating control means reverts to a controlled cooking temperature below 212° F. The water stops boiling and, as the steam condenses on the relatively cooler food, the pressure within the vessel falls. At the check valve pressure the check valve ball seats on the O-ring preventing air from re-entering the vessel. The vessel pressure then continues to fall and reaches the saturation pressure for steam at the preset controlled cooking temperature, generally from 170° to 200° F. for cooking; 150° to 190° F. for thawing, depending on the foodstuff and its use; and 140° to 150° F. for warming and/or holding.

The heating control means may be any of the well-known on-off types. Thus, to restate the purge process, when the heating control means reverts to the preset operating temperature, as described above, the heater is shut off for a time and it does not come on again until the temperature of the vessel has fallen below the set level. When the heater thus is cut off for the first time at the end of the purge-vent cycle, steam continues to condense on the food and, to some degree, on the walls of the vessel but no further steam is being generated since the heater is now off. Thus, the pressure within the vessel must fall and, as the falling pressure reaches a level of about $\frac{1}{10}$ p.s.i.g., the purge-venting means automatically closes and seals the vessel against the re-entry of air into the vessel. In a preferred embodiment, the check ball falls back onto its O-ring seat and seals the vessel against this re-entry of air. From this point onward, all operation takes place under partial vacuum conditions. The cooking operation is such that the steam pressure in the now completely closed vessel will equilibrate at a level controlled by the preset cooking temperature and the saturation properties of steam. Since this temperature is below 212° F. the operating pressure will be subatmospheric.

At the completion of the cooking, heating, holding, or thawing operation, the user relieves the vacuum inside the vessel. In a preferred embodiment, this is accomplished by unseating the purge-venting means check ball which vents the vessel to the atmosphere via orifice 10 and channel 10'. The lid of the vessel may now be unlatched and removed and the cooked, thawed or warmed foodstuff may now be removed from the vessel.

It is a feature of my invention that my vacuum release may be combined with the purge-venting means in the lid, in the vessel, or as shown in FIG. 1, to make possible the ultimate removal of the lid without reheating the vessel to 212° F.—an alternate way to raise the vessel to atmospheric pressure.

EXAMPLE

A test program was conducted to establish the performance characteristics of the thawer-cooking vessel and method of using the same. For example, identical two-pound beef roasts were thawed and cooked utilizing five different methods. When utilizing the thawer-cooker vessel and method of my invention, this round roast was thawed completely for cooking in 30 minutes and was completely cooked 40 minutes later, for a total thawing-cooking time of 70 minutes.

When using the thawer-cooking vessel of my invention for just the thawing of the round roast, once again 30 minutes was required to completely thaw the roast for cooking. The thawed roast was then placed in a 300° F. oven and a total cooking time of 70 minutes was necessary to cook the roast to the same degree as when using the thawer-cooking vessel for both thawing and cooking. This represented an increase of 30 minutes of additional time necessary to cook the roast to the same level as before.

A 300° F. oven was used for thawing and cooking and the same weight of roast was thawed in 80 minutes and cooked in 70 minutes later for a total thawing-cooking time of 150 minutes.

A room temperature thawing test was performed and this roast took 4 hours to thaw and an hour, at 300° F. to cook.

When thawing the two-pound round roast in a refrigerator, approximately 10 hours were necessary to thaw this meat and 1 hour was required for cooking.

It should be readily apparent that the thawer-cooking vessel and my method of utilizing this vessel is much more efficient than the other methods utilizable in thawing and cooking this roast round of beef.

A preferred embodiment of my invention provides a thawer-cooker vessel comprising, in combination, a container having a bottom, a side wall, sealing means disposed at the upper edge of said side wall, a lid extending over the entire container, said lid having sealing means to co-operatively engage said side wall sealing means to form a closed chamber, latching means for securing said lid to said container, heating control means to regulate the temperature of said chamber, and a purge-venting means that automatically opens to the atmosphere when the pressure within the vessel exceeds a predetermined pressure, and automatically closes to the atmosphere when the pressure within the vessel falls below said predetermined pressure, said purge-venting means also providing release means, in combination, disposed in handle means which comprise a check ball seated on an elastomeric O-ring all housed within a single cavity in said handle wherein a spring loaded check ball release button may be located which may be selectively activated for removal of the lid.

I claim:

1. A method for thawing and/or cooking a foodstuff which comprises:
    (a) introducing a predetermined amount of water into a thawer-cooker vessel having a bottom and a side wall and having sealing means disposed at the upper edge of said side wall, a removable lid extending over the entire container, said lid having sealing means to co-operatively engage said side wall sealing means, latching means for securing said lid to said container so that said lid sealing means co-operatively engage said side wall sealing means to form a closed air-tight chamber containing only air entrapped within said chamber, heating control means to regulate the temperature within said chamber, and purge-venting means in combination with vacuum relief means disposed on said vessel, said purge-venting means automatically opening to the atmosphere when vessel pressure exceeds a predetermined pressure greater than about $\frac{1}{10}$ p.s.i.g. and automatically closing to the atmosphere when vessel pressure falls below said predetermined pressure, said vacuum relief means allowing removal of said lid, and introducing said foodstuff onto holding means in said vessel;
    (b) closing and latching said vessel with said lid and latching means whereby air is entrapped within said vessel;
    (c) heating said water in said vessel with said heating control means to a temperature above about 212° F. so that steam is generated which increases the pressure within the closed vessel whereby said purge-venting means automatically opens for a time sufficient to allow escaping steam to sweep all of said entrapped air leaving substantially air-free steam in said vessel;
    (d) conditioning said heating control means to revert to a controlled cooking temperature below about 212° F. whereby steam temporarily ceases to be generated and whereby said purge-venting means automatically closes and seals said vessel against the reentry of air into said vessel;
    (e) completing the cooking operation under partial vacuum at cooking conditions below 212° F. wherein the transfer of heat to the food is via direct contact condensation of said substantially air-free steam at sub-atmospheric pressure onto said foodstuff;
    (f) relieving said vacuum inside said vessel through said purge-venting means so that said lid may be unlatched and removed; and,
    (g) removing said cooked foodstuff from said vessel.

2. The method of Claim 1 further characterized wherein said purge-venting means in combination with vacuum relief means is disposed within handle means attached to the lid of said vessel and comprises a check ball seated on an elastomeric O-ring within a single cavity in said handle and includes a release means for selectively unseating said check ball.

3. The invention as defined in Claim 1 wherein said purge-venting means is closed to the atmosphere at a first predetermined pressure below about $\frac{1}{10}$ p.s.i.g. and wherein said purge-venting means is open to the atmosphere at a second predetermined pressure greater than about $\frac{1}{10}$ p.s.i.g.

4. The invention as defined in Claim 1 wherein said purge-venting means in combination with vacuum relief means is disposed within handle means attached to the lid of said vessel.

5. The invention as defined in Claim 1 wherein said vessel is a portable cooking appliance having its own heating and heating control means.

References Cited
UNITED STATES PATENTS

| | | | |
|---|---|---|---|
| 2,649,775 | 8/1953 | Welden | 99—344 |
| 2,948,620 | 8/1960 | Ashley | 426—510 |
| 2,611,070 | 9/1952 | Chandler | 219—441 |

NORMAN YUDKOFF, Primary Examiner

C. P. RIBANDO, Assistant Examiner

U.S. Cl. X.R.

426—510, 524